United States Patent [19]
Gray

[11] Patent Number: 6,002,314
[45] Date of Patent: Dec. 14, 1999

[54] UTILIZATION OF MAGNETIC BUBBLES TO PRODUCE A MOTIVE FORCE

[76] Inventor: Robert W. Gray, 180-4 Poplar St., Rochester, N.Y. 14620

[21] Appl. No.: 09/248,576

[22] Filed: Feb. 11, 1999

[51] Int. Cl.[6] ..................................................... H01H 9/00
[52] U.S. Cl. .............................. 335/207; 365/1; 335/306; 310/80
[58] Field of Search ..................................... 335/177–179; 310/26, 46, 80, 82, 323; 361/139, 143, 146–147; 365/1–3, 6, 8, 19, 23, 25, 30

[56] References Cited

U.S. PATENT DOCUMENTS

| | | | |
|---|---|---|---|
| 3,890,605 | 6/1975 | Sionczewcki | 340/174 |
| 3,979,737 | 9/1976 | Braginski | 340/174 |
| 4,025,911 | 5/1977 | Bobeck et al. | 340/174 |
| 4,027,295 | 5/1977 | Maegawa et al. | 340/174 |
| 4,178,636 | 12/1979 | Argyle et al. | 365/30 |
| 4,315,214 | 2/1982 | Kataoka | 324/208 |
| 5,148,068 | 9/1992 | Kushida et al. | |
| 5,229,738 | 7/1993 | Knapen | |
| 5,717,259 | 2/1998 | Schexnayder | |

OTHER PUBLICATIONS

Nishida et al. "Formation of Normal and Hard Bubbles by Cutting Strip Domains", IEEE Transactions on Magnetics, vol. MAG–9, No. 3, Sep. 1973, pp. 517–520.

T.H. O'Dell, "Magnetic Bubbles", Halstead Press Book, John Wiley & Sons, New York 1974, title page and pp. 4–9 (no month).

T.H. O'Dell, "Ferromagnetodynamics, The Dynamics of Magnetic Bubbles, Domains and Domain Walls," Halstead Press Book, John Wiley & Sons, New York, 1981, title page and pp. 16–24 (no month).

Seshadri et al., "Forced Shear Flow of Magnetic Bubble Arrays," The American Physical Society, Physical Review Letters, vol. 70, No. 2, Jan. 11, 1993, pp. 234–237.

Junmin Hu et al., "Commensurate–incommensurate Transitions in Magnetic Bubble Arrays with Periodic Line Pinning," The American Physical Society, Physical Review B., vol. 55, No. 2, Jan. 1, 1997–11, pp. 771–774.

*Primary Examiner*—Lincoln Donovan
*Attorney, Agent, or Firm*—Eugene Stephens & Associates

[57] ABSTRACT

Motion of a magnetic bubble material is caused by subjecting magnetic bubbles within the material to a magnetic field gradient. The bubbles respond to the magnetic field gradient by producing forces angled from the direction of the magnetic field gradient. The magnetic bubbles are constrained from moving within the magnetic bubble material, which is rotated in the magnetic field gradient to cause Bloch lines in bubble domain walls to rotate within the material. This produces forces causing the material to move.

40 Claims, 4 Drawing Sheets

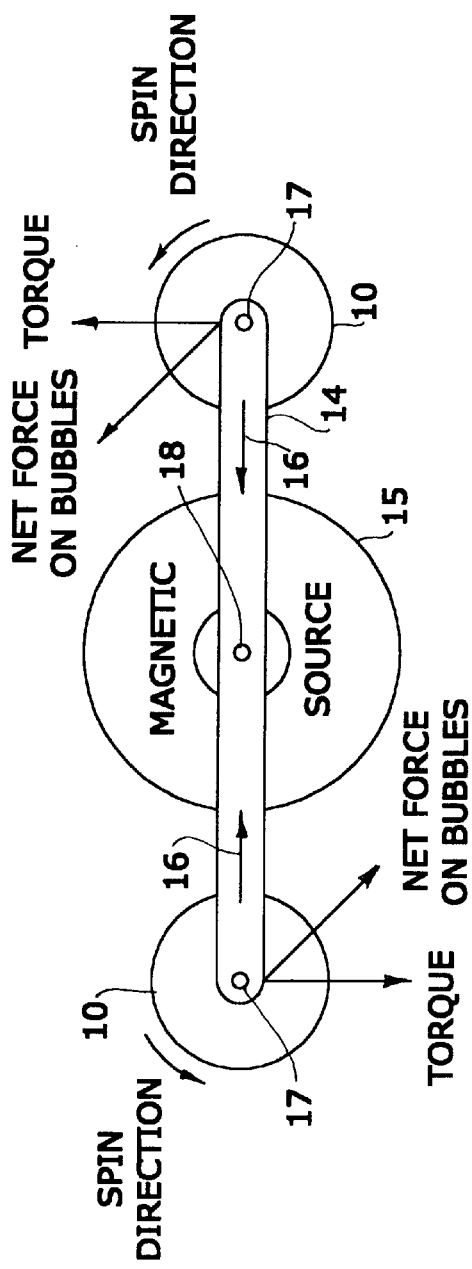
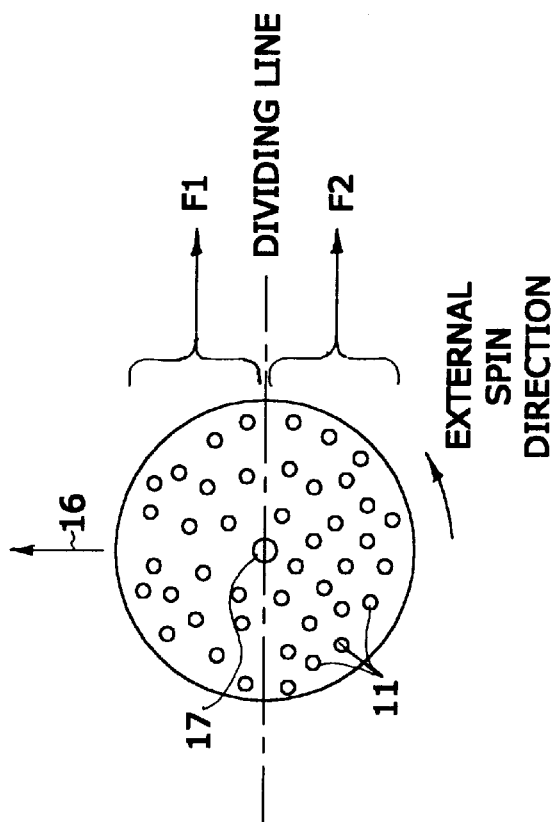
FIG.5A
FIG.5B

UTILIZATION OF MAGNETIC BUBBLES TO PRODUCE A MOTIVE FORCE

TECHNICAL FIELD

Magnetic bubble materials deployed as motion producers.

BACKGROUND

Magnetic bubbles are generally cylindrical-shaped regions within a material in which a magnetization vector direction within the bubbles is opposite to a magnetization vector direction in the material outside the bubbles. Materials producing magnetic bubbles are often thin crystalline films, but magnetic bubbles are not limited to such materials.

Magnetic bubbles have been studied primarily as prospects for information storage and processing. Although considerable knowledge has been developed on magnetic bubbles, they have so far not been widely exploited for other uses.

From the extensive literature on magnetic bubbles, the following selections provide basic information on magnetic bubble characteristics, to aid in understanding this invention:

"Formation of Normal and Hard Bubbles by Cutting Strip Domains", by Hideki Nishida, Tsutomu Kobayashi, and Yutaka Sugita, IEEE Transactions on Magnetics, Vol. MAG-9, No. 3, September 1973, pages 517–520.

*Magnetic Bubble Technology*, 2nd edition, by A. H. Eschenfelder, Springer-Verlag, 1981, title page and pages 70–74.

*Ferromagnetodynamics, The dynamics of magnetic bubbles, domains and domain walls*, by T. H. O'Dell, Halsted Press Book, John Wiley & Sons, New York, 1981, title page and pages 16–24, 98–114.

"Forced Shear Flow of Magnetic Bubble Arrays", by R. Seshadri and R. M. Westervelt, The American Physical Society, Physical Review Letters, Volume 70, Number 2, Jan. 11, 1993, pages 234–237.

"Commensurate-incommensurate transitions in magnetic bubble arrays with periodic line pinning", by Junmin Hu and R. M. Westervelt, The American Physical Society, Physical Review B, Volume 55, Number 2, Jan. 1, 1997-II, pages 771–774.

My copending patent application No. 09/090,369, filed Jun. 4, 1998, suggests ways that magnetic bubble materials can be exploited to produce motion. It proposes moving bubble material in response to a magnetic field gradient by using a magnetic bubble material that allows, but also resists, magnetic bubble movement within the material.

SUMMARY OF THE INVENTION

The invention of this application involves a way of accomplishing movement of magnetic bubble material in which magnetic bubbles are constrained from movement.

This invention advances beyond my previous application and beyond basic research by others on the properties of magnetic bubbles and proposes ways of producing motion using forces resulting from responses to a magnetic field gradient of magnetic bubbles constrained from movement within a magnetic bubble material.

Producing material motion with magnetic bubbles according to this invention involves use of a magnetic bubble material having a multitude of pinned or confined magnetic bubbles that are constrained from movement within the material and a source that applies to the material a magnetic field gradient to which the magnetic bubbles respond. The material in which the magnetic bubbles are constrained from movement is made to spin or rotate within the magnetic field gradient so that Bloch lines (BLs) within the domain walls of the bubbles rotate within the material. The rotating Bloch lines in the bubble domain walls produce forces inclined from the direction of the magnetic field gradient, and the resultant of these forces causes movement of the rotating material in a direction between zero and 90 degrees from the direction of the magnetic field gradient. The material containing the magnetic bubbles is mounted to allow movement in the direction of the resultant force while the material is rotating.

The bubbles are of suitable structural states so that a resultant of the forces produced by the bubbles in response to the magnetic field gradient is oriented between zero and 90 degrees from the direction of the magnetic field gradient. The material containing the magnetic bubbles offers resistance or otherwise restricts the translational movement of the magnetic bubbles in the material in some desirable direction without restricting the material's movement in the same direction. The resultant of the forces on the bubbles then causes the material to move in the desired direction. Such movement of the material can be exploited in many ways to achieve beneficial results.

DRAWINGS

FIG. 5A is a schematic plan view of a motion-producing device using a magnetic source and a pair of magnetic materials mounted for movement around the source.

FIG. 5B is a schematic diagram showing resultants of translational forces on different regions of a disk of magnetic bubble material rotating within a magnetic field gradient.

DETAILED DESCRIPTION

Magnetic bubbles can exist in many different materials. Some types of materials that have been investigated are:

Orthoferrites

Garnets ((EuY)(3)(GaFe)(5)O(12)), for example

Hexagonal ferrites BaFe(12)O(19), for example.

Other materials are also known to support magnetic bubbles, and research has not yet identified all the possibilities for magnetic bubble materials.

Figure 1:
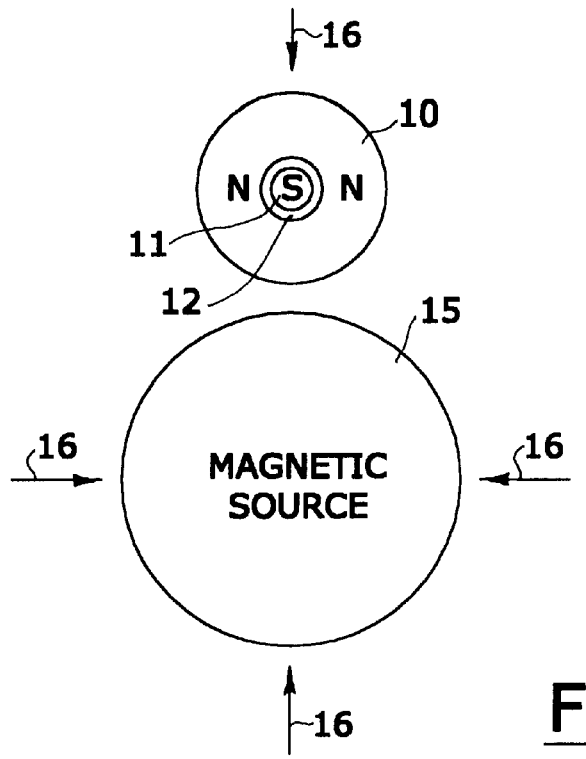
FIGS. 1 and 2 are schematic drawings of a magnetic source producing a magnetic field having a gradient direction intersecting an illustrative magnetic bubble in a magnetic bubble material.
Figure 2:
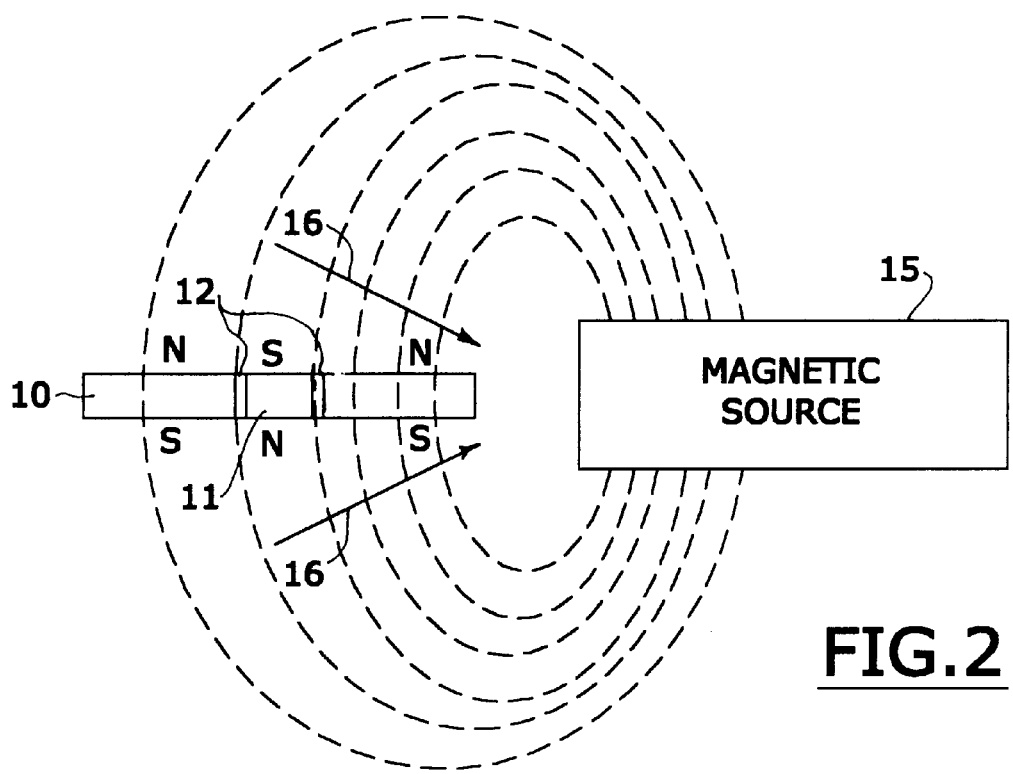

FIGS. 1 and 2 show a magnetic bubble material 10 that is simplified by having a single magnetic bubble consisting of an interior magnetization region 11 within a domain wall 12.

Bubble material 10 is arranged near a magnetic source 15 producing a magnetic field shown in broken lines and having a field gradient direction 16 pointing in the direction of increasing field strength.

The S and N labels showing magnetic field polarity indicate that bubble interior 11 has a magnetization polarity opposite from the magnetization polarity of the rest of the magnetic bubble material 10. The magnetic bubble's domain wall 12 is a region of transition in which a magnetization vector direction rotates through 180 degrees. The characteristics of magnetic bubbles derive from the various domain wall structures 12 that the magnetic bubble can have.

Application of a magnetic field gradient causes the magnetic bubble's domain wall structure 12 to be rearranged. The magnetic field gradient can also cause the magnetic bubbles within the material to translate through the magnetic material if the magnetic bubbles have not been restricted from doing so. Movement and direction of movement of magnetic bubbles within magnetic bubble materials have been studied, and it is known that magnetic bubbles repel each other and resist being packed too closely together.

Figure 3:
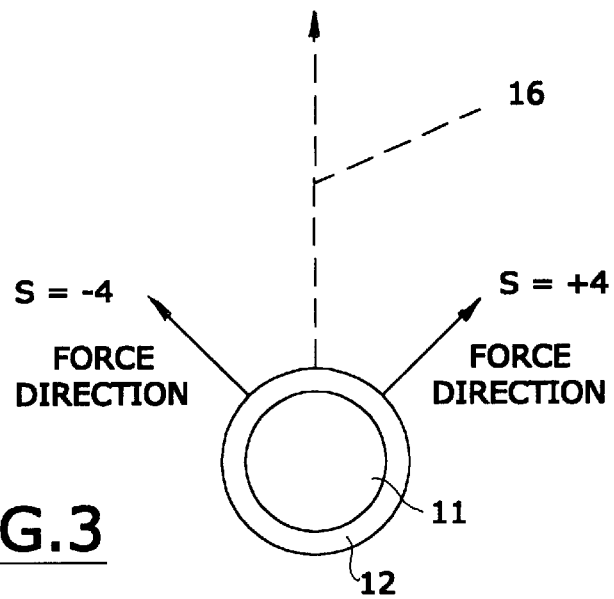
FIG. 3 is a schematic diagram of forces on a magnetic bubble relative to a magnetic field gradient direction, depending on bubble states.

An important aspect of magnetic bubble movement within a magnetic material is illustrated in FIG. 3. Researchers have assigned to magnetic bubbles state or S numbers indicating, in part, their deflection direction away from the direction of an applied magnetic field gradient 16. FIG. 3 illustrates examples of forces resulting from responses of a magnetic bubble domain wall 12 to a magnetic field gradient 16, depending on two possible states of the bubble's domain wall structure 12 as the bubble translates through the material. The examples picked for FIG. 3 are S=−4 and S=+4, showing force directions oblique to magnetic field gradient direction 16 and on respectively opposite sides of gradient direction 16.

Positive and negative states 1, 2, and 3 are also possible for magnetic bubbles; and higher numbered states are also possible. Lower magnitude state numbers |S| generally cause bubble movement at smaller deflection angles from the direction of the magnetic field gradient. Magnetic bubbles with |S|>0 can withstand larger magnetic field strengths before being destroyed than magnetic bubbles with |S|=0; they are "harder" to destroy. Magnetic bubbles with |S|>0 are referred to as hard magnetic bubbles.

Because of the computer technology goal of most investigators, bubble material research has been directed mostly toward achieving smaller and smaller bubble sizes and faster bubble mobility. Additionally, hard bubbles have been considered undesirable for computer technology purposes so that methods of suppressing them have been sought. However, for producing motion according to my invention, just the opposite is desired; hard bubbles are preferred.

It is hypothesized, in the literature, that the magnitude of the state number |S| gives an indication of the number of Bloch lines (BLs) in the magnetic bubble's domain wall structure while the sign of the state number indicates whether the BLs are twisted clockwise or counterclockwise. In other words, while the magnetization vector direction rotates through 180 degrees as we traverse the magnetic bubble's domain wall from the inside of the magnetic bubble to outside of the magnetic bubble, it may also twist clockwise or counterclockwise.

Figure 4A:
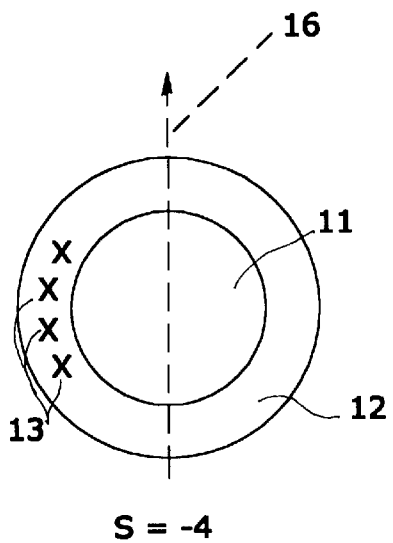
FIGS. 4A and 4B are schematic diagrams of the magnetic bubble domain wall structure showing positions of Bloch lines in response to a magnetic field gradient, depending on bubble state.
Figure 4B:
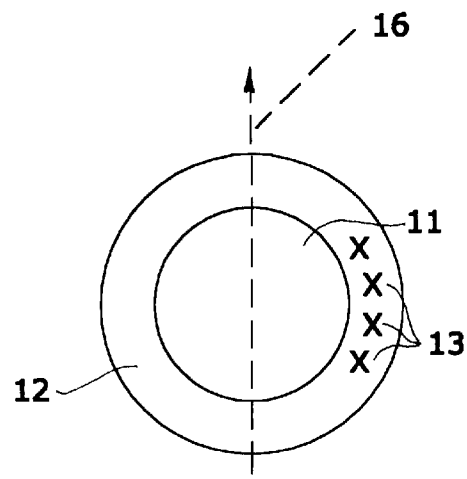

FIG. 4 illustrates the fact that the Bloch lines 13 become arranged in response to the application of the magnetic field gradient by clustering mainly to one side of the magnetic bubble with respect to the magnetic field gradient direction. The asymmetrical distribution of the BLs 13 around the bubble's domain wall 12, with respect to the direction of the applied magnetic field gradient 16, causes a deflection force as the domain wall structure moves through the material. The domain wall structure being asymmetrical results in the forces on the domain wall being asymmetrical.

I have found that the response of the Bloch lines to the applied magnetic field gradient, resulting in grouping the BLs predominately to the right or left hand side of the magnetic bubble, with respect to the gradient direction, applies even as the magnetic bubble material is rotated with respect to the magnetic field gradient direction. The BLs accomplish this grouping, by moving through the material rotationally around the magnetic bubbles, even though the magnetic bubble as a whole is constrained from moving within the material. If the material is rotated in an orientation that moves the magnetic bubbles through regions of the magnetic field gradient differing in magnetic strength, this will cause rotational movement of the grouped Bloch lines around the domain walls of the magnetic bubbles. Such a rotational orientation also changes the orientation of the Bloch lines with respect to the magnetic field gradient direction, which causes rotational movement of the grouped Bloch lines around the domain walls of the magnetic bubbles. A rotation of the magnetic bubble material that accomplishes this is generally approximately perpendicular to the direction of the magnetic field gradient, although rotation departing from perpendicular to the magnetic field gradient by a large acute angle may also work.

FIG. 5A schematically shows a way of accomplishing the goal of my invention, which is to move a magnetic bubble material 10 in ways not otherwise possible in the absence of magnetic bubbles. The magnetic bubbles are, in this case, prevented from translating through the material 10. This may be accomplished either by depositing permalloy dots or lines onto the materials' surface to confine the magnetic bubbles or, in the case of composite material, by the physical extent of the particles which compose the materials 10, but constraining bubble motion is not limited to these two methods. The two materials 10 are then set spinning about axes 17 in the same direction to each other, while armature 14 remains stationary. When a magnetic field gradient source 15 is applied, forces on the magnetic bubbles' domain wall structure are produced in magnetic bubble materials 10 as shown. This causes a torque on armature 14 which is free to rotate around the magnetic field gradient source 15 about axis 18.

The bubbles in material 10 are preferably predominantly of the same S sign and are preferably hard magnetic bubbles with high S values so that a resultant of all the forces produced by all the bubbles in response to the field of magnetic source 15 is oblique to the direction of a magnetic field gradient 16 of source 15. Two factors then lead to movement of armature 14. One factor translating bubble forces into torque is the resistance that materials 10 offer to internal movement of bubbles, and another factor is that materials 10 are constrained by armature 14 against moving in the direction of magnetic field gradient 16 but are free to rotate about source 15. The resulting torque moves armature 14 around source 15.

FIG. 5B illustrates that the top half of the magnetic material 10 is in a region of greater magnetic field strength since the top half is further along the direction of the magnetic field gradient 16. As a result, all of the magnetic bubbles in the top half of material 10 will generate a sum total larger force component F1 on material 10 than the force component F2 generated from the magnetic bubbles in the bottom half of material 10. Therefore, in addition to the net sideways translational force component (F1+F2) on the material 10, there will arise an additional torque about the spin axis 17. This additional torque can be either in the same direction or opposite direction to the externally applied torque which spins the material 10.

Magnetic bubbles have a maximum speed through magnetic bubble material; and in materials that constrain magnetic bubbles from movement, the Bloch lines of magnetic bubble domain wall structure also have a maximum possible speed through the material. The spinning of the material 10 must not exceed a rate for which the BLs in the domain walls cannot remain predominately on the right (or left) hand side of the domain wall with respect to the magnetic field gradient direction.

Figure 6:
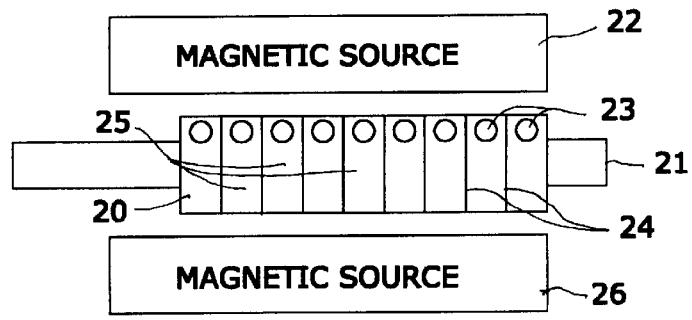
FIG. 6 is a schematic view of an alternative form of motion producer using magnetic bubble material constraining magnetic bubbles from moving in a direction of material motion.

Surface treatment of the magnetic material is known to produce resistance to bubble movement in the material. Photolithography techniques have been used to deposit permalloy dots and lines onto the surface of magnetic bubble material which effectively pin the magnetic bubbles within a juxtaposed multitude of small increments of magnetic bubble materials. Such a possibility is schematically illustrated in FIG. 6. The material 20 is rectangular in shape, but could be of other shapes, on which permalloy strips 24 have been deposited to section off consecutive regions 25 of the material. In this arrangement, the magnetic bubbles 23 are restricted from moving left or right across a permalloy strip but are free to move top to bottom or bottom to top between the strip of permalloy. In this case, the material 20 is not spun. The hard magnetic bubbles are all arranged to be of the same type (S positive or negative) such that when magnetic field gradient source 26 is energized, the hard magnetic bubbles 23 will move down and to the left, pushing the material 20 leftward along the slide 21. With the magnetic bubbles at the bottom of the material, magnetic source 26 is deactivated and magnetic source 22 can be activated to reverse the magnetic field gradient as well as the motion of the material 20. Although one magnetic bubble 23 per sectioned material 25 is shown in FIG. 6, there would be potentially hundreds of hard magnetic bubbles per section to increase the force against the material 20. The limit depends on the width of the material 20 and the length through which it is desired to have the magnetic bubbles move. The larger the length through which the magnetic bubbles move, the longer the force on the material will be applied.

Figure 7:
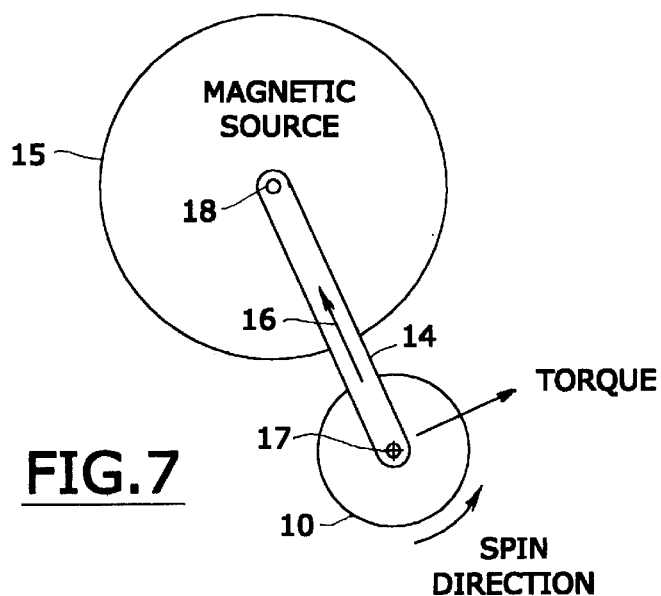
FIGS. 7 and 8 are schematic views of a magnetic bubble motion-producing device that moves both in response to a magnetic field and in the absence of a magnetic field.
Figure 8:
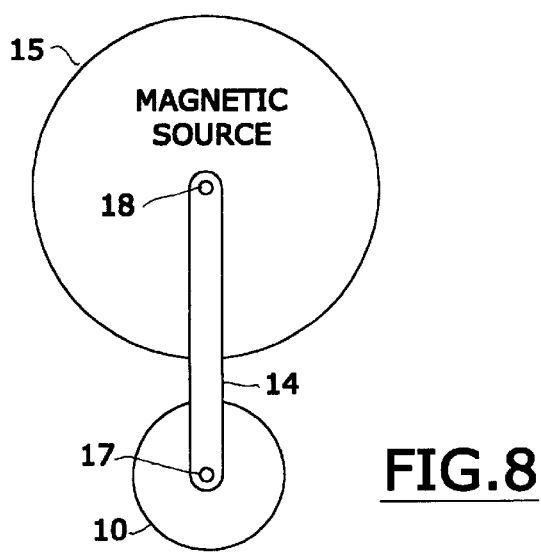

An arcuate reciprocal motion of a magnetic bubble material 10 is illustrated in FIGS. 7 and 8. The material 10 has its magnetic bubbles pinned and has been set spinning about axis 17. A magnetic source 15 is activated in FIG. 7 to move magnetic bubble material 10 to its illustrated position, as supported by arm 14. Deenergizing magnetic source 15 allows magnetic material 10 to move gravitationally to the position of FIG. 8. Springs and other resilient elements can also accomplish return movement from a magnetically energized position of a magnetic bubble material.

A source of magnetic energy for moving magnetic bubble materials need not be an electromagnet. A magnetic field gradient produced by a permanent magnet can also cause movement of magnetic bubble materials.

I claim:

1. A motion producer comprising:
   a. a movably disposed material containing a multitude of magnetic bubbles;
   b. the magnetic bubbles being constrained from movement within the material;
   c. a source producing a magnetic field gradient in the region of the material; and
   d. the material being rotated in an orientation causing domain wall structure of the magnetic bubbles to rotate relative to the material in response to the magnetic field gradient and thereby causing a force moving the rotating material.

2. The motion producer of claim 1 wherein the frequency of rotation of the material does not exceed a rate at which Bloch lines in the domain walls can rotate within the material.

3. The motion producer of claim 1 wherein rotation of the material moves the bubbles through regions of the magnetic field gradient differing in magnetic strength.

4. The motion producer of claim 1 wherein an axis of rotation of the material is approximately perpendicular to the magnetic field gradient.

5. The motion producer of claim 1 wherein a second source produces a second magnetic field gradient oriented so that a response of the magnetic bubbles to the second magnetic field gradient produces a force causing the material to move in a second direction.

6. The motion producer of claim 1 wherein a resultant of the forces produced by each of the magnetic bubbles is oriented between zero and 90 degrees from a direction of the magnetic field gradient.

7. The motion producer of claim 1 wherein the source producing the magnetic field gradient is intermittent, and movement of the material occurs while the magnetic field gradient is applied.

8. The motion producer of claim 1 wherein the movement of the material is in a direction different from a direction of the magnetic field gradient.

9. The motion producer of claim 1 wherein a source is energizable to reverse a polarity of the magnetic field gradient and thereby alter a direction of movement of the material.

10. The motion producer of claim 1 wherein the material is constrained from translational movement in a direction of the magnetic field gradient.

11. A motion-producing device comprising:
   a. a material containing a multitude of magnetic bubbles that respond to a magnetic field gradient;
   b. the material being arranged to rotate within the magnetic field gradient;
   c. the material being arranged to constrain the magnetic bubbles from moving within the material; and
   d. rotation of the material within the magnetic field gradient causing Bloch lines to rotate within domain walls of the magnetic bubbles in response to the magnetic field gradient, to cause the material to move.

12. The device of claim 11 wherein the bubbles have S-values of predominantly the same sign.

13. The device of claim 11 wherein a frequency of the rotation of the material does not exceed a maximum frequency of rotation of the Bloch lines within the domain walls.

14. The device of claim 11 wherein a source producing the magnetic field gradient operates intermittently.

15. The device of claim 11 wherein an axis of rotation of the material is approximately perpendicular to the magnetic field gradient.

16. The device of claim 11 wherein a pair of sources producing differently oriented magnetic field gradients operate alternately to produce different material movements.

17. The device of claim 11 wherein the responses of the magnetic bubbles to the magnetic field gradient produce a resultant force angled between zero and 90 degrees to a direction of the magnetic field gradient.

18. The device of claim 11 wherein the magnetic field gradient can be changed in polarity to alter a direction of movement of the material.

19. The device of claim 11 wherein the material is constrained from translational movement in a direction of the magnetic field gradient.

20. The device of claim 11 wherein the movement of the material is in a direction different from a direction of the magnetic field gradient.

21. A system causing movement of a movable element, the system comprising:
   a. the movable element including a material having a multitude of magnetic bubbles constrained from movement within the material;
   b. a source producing a magnetic field gradient in a region of the material;
   c. the material being rotated within the magnetic field gradient in an orientation causing rotation of Bloch lines in domain walls of the magnetic bubbles relative to the material; and
   d. the Bloch line movement of the constrained bubbles in the magnetic field gradient causing a resultant force that moves the movable element.

22. The system of claim 21 wherein the frequency of rotation of the material is within a maximum frequency of rotation of Bloch lines within the domain walls.

23. The system of claim 21 wherein rotation of the material moves the bubbles through regions of the magnetic field gradient differing in magnetic strength.

24. The system of claim 21 wherein an axis of rotation of the material is approximately perpendicular to the magnetic field gradient.

25. The system of claim 21 wherein the movement direction in which the bubbles are urged is zero to 90 degrees from an increasing direction of the magnetic field density.

26. The system of claim 21 wherein a resultant of forces produced by the bubbles in response to the magnetic field gradient is inclined from a direction of the magnetic field gradient.

27. The system of claim 21 wherein a second source produces a second magnetic field gradient oriented to urge the bubbles in a second movement direction.

28. The system of claim 21 wherein the source alters the magnetic field gradient to alter a direction of movement of the movable element.

29. The system of claim 21 wherein the source operates intermittently.

30. The system of claim 21 wherein the material is constrained from movement in a direction of the magnetic field gradient.

31. A system producing motion from energy of a magnetic field having a gradient oriented in a direction of increasing magnetic energy, the system comprising:
   a. the magnetic field being applied to a material having a multitude of magnetic bubbles constrained from movement within the material;
   b. the material being rotated within the magnetic field so as to cause Bloch lines in domain walls of the magnetic bubbles to rotate relative to the material;
   c. rotation of the Bloch lines in bubble domain walls producing forces on the material in response to the magnetic field; and
   d. a resultant of the forces produced by the domain walls of the bubbles is oriented from zero to 90 degrees from the direction of the magnetic field gradient, causing the material to move.

32. The system of claim 31 wherein movement of the material is in a direction different from the direction of the magnetic field gradient.

33. The system of claim 31 wherein a frequency of rotation of the material does not exceed a maximum frequency of rotation of the Bloch lines in the bubble domain walls.

34. The system of claim 31 wherein rotation of the material moves the bubbles through regions of the magnetic field gradient differing in magnetic strength.

35. The system of claim 31 wherein an axis of rotation of the material is approximately perpendicular to the magnetic field gradient.

36. The system of claim 31 wherein the magnetic field is applied intermittently.

37. The system of claim 31 including more than one source of a magnetic field, each source producing a magnetic field gradient oriented in a different direction, and the sources being operable at different times to produce different movements of the material.

38. The system of claim 31 wherein a polarity of the magnetic field is reversible.

39. The system of claim 38 wherein a direction of movement of the material is reversible.

40. The system of claim 31 wherein the material is constrained from movement in a direction of the magnetic field gradient.

* * * * *